Jan. 20, 1942.　　　A. W. SEYFRIED　　　2,270,480
DRINK MIXER AGITATOR
Filed Dec. 2, 1940　　　2 Sheets-Sheet 1
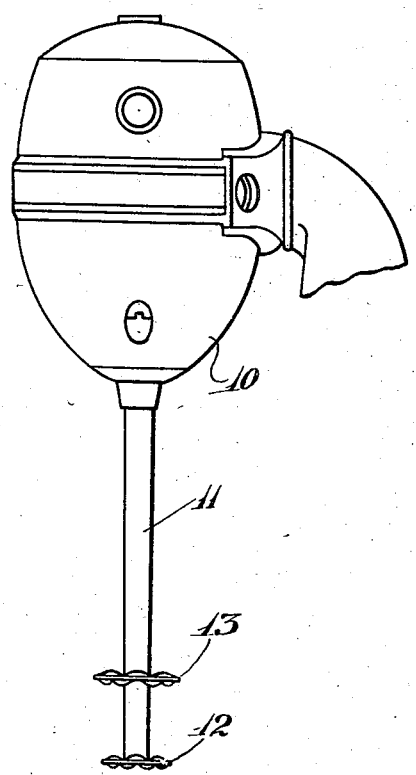
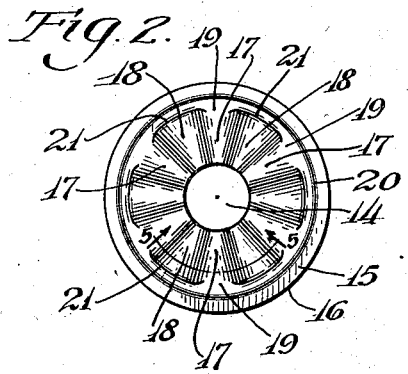
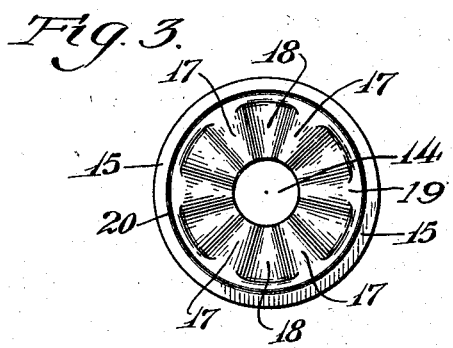
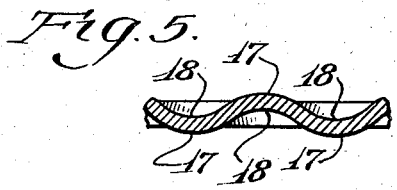
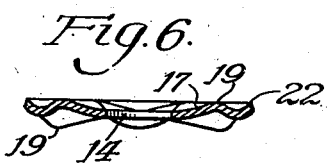
Inventor:
Arthur W. Seyfried
By: Bertha L. MacGregor
Attorney Jan. 20, 1942.   A. W. SEYFRIED   2,270,480
DRINK MIXER AGITATOR
Filed Dec. 2, 1940   2 Sheets-Sheet 2
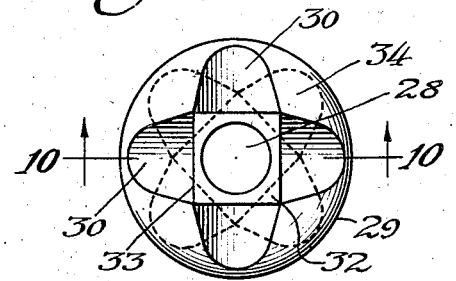
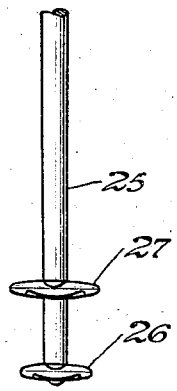
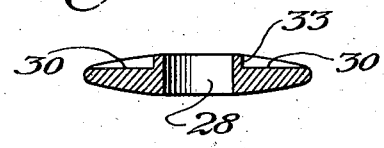
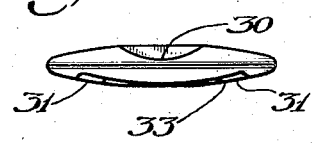
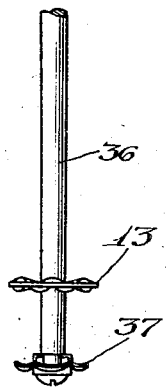
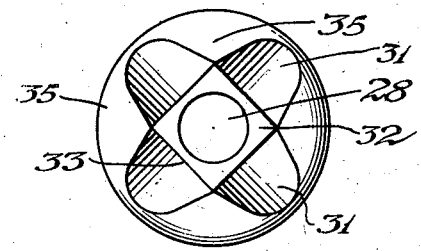
Inventor:
Arthur W. Seyfried
By: Bertha L. MacGregor
Attorney.

Patented Jan. 20, 1942

2,270,480

UNITED STATES PATENT OFFICE 2,270,480

DRINK MIXER AGITATOR

Arthur W. Seyfried, Racine, Wis., assignor to Scovill Manufacturing Company, Waterbury, Conn., a corporation of Connecticut Application December 2, 1940, Serial No. 368,160

3 Claims. (Cl. 259—134)

This invention relates to drink mixer agitators and particularly to agitators which speedily and efficiently mix drink ingredients and aerate the mixture.

The main object of this invention is to produce agitators capable of aerating drink mixtures for the purpose of enhancing their palatability to a degree substantially greater than has heretofore been accomplished. The palatability of milk drinks and the like depends to a great extent on the degree of aeration imparted to the drink in the process of mixing the ingredients. The degree of aeration may be measured by the increased volume of the drink mixture.

The time required for mixing the ingredients is also a consideration in the selection of agitator devices, and it is an object of this invention to greatly increase the aeration of the mixture without increasing the time heretofore required for completely mixing similar ingredients.

Another object is to provide agitators capable of mixing light, medium and heavy drinks in a comparably efficient manner. Some known types of agitators are relatively efficient, both as to aeration obtained and time required, for mixing heavy drinks, but they fail to perform efficiently with respect to aeration of light drinks. The agitators herein shown and described produce a greater degree of aeration in all kinds of drink mixtures than can be produced by other types of agitators.

Agitator devices heretofore used include (1) plain imperforate discs, (2) plain discs provided with holes, (3) embossed discs in which undulations extend in concentric paths from the shaft receiving opening to the periphery of the disc, (4) embossed discs such as just described in which the periphery is not concentric but is irregular or scalloped, and (5) discs having radially or spirally extending slits which in effect reduce each disc to a plurality of blades. The art also includes an agitator button comprising a plurality of blades mounted for pivotal movement from radially extending to collapsed or nested positions adjacent the agitator shaft.

Numerous experiments in which such agitators were employed by me to mix drink ingredients have disclosed the fact that the embossed discs such as described in item (3), the embossed-scalloped discs of item (4) and the multiple blade discs serve well to mix ingredients quickly but that the resultant mixtures are less aerated than are the same ingredients when mixed by plain agitators such as described in items (1) and (2), which, however, require more time to complete the mixing. Mixing is completed when all lumps of ice cream or other materials in the drink have disappeared and the ingredients form a smooth mixture. For example, using a light drink mixture consisting of 8 oz. milk, 1½ oz. ice cream, 1½ oz. chocolate, and ½ oz. milk powder, total 11½ oz., I have found that the agitators described in items (1) to (4), inclusive, complete the mixing in the times stated and increase the initial volume to the volumes set forth:

| (1) | (2) | (3) | (4) |
|---|---|---|---|
| 80 sec. 18½ oz. | 80 sec. 18 oz. | 60 sec. 17½ oz. | 60 sec. 16¼ oz. |

Experiments with heavier mixtures, that is, less milk and more of the other ingredients, show comparable results by using the several agitators, although heavier drinks require longer to become mixed and their volume increases to a lesser degree than do the lighter drinks.

In order to increase the greatest aeration obtained by the prior art agitators, such as items (1) and (2), within the shortest time required by prior art agitators, such as items (3) and (4), agitators embodying the present invention were designed. Using the same light drink mixture described, agitators made according to this invention complete the mixing in 60 seconds and increase the initial 11½ oz. volume to 19½ oz. Furthermore, they perform relatively better than other agitators on all kinds of drink mixtures.

The several forms of the invention hereinafter described are characterized by the fact that the agitator discs are provided with aeration producing contours or undulations but are free from surfaces or edges which destroy or impair the aeration previously produced.

In the drawings:

Fig. 1 is a side elevation of a motor driven agitator embodying my invention.

Figs. 2, 3 and 4 are top, bottom and edge views, respectively, of one of the agitator discs shown in Fig. 1.

Fig. 5 is a sectional view, enlarged, taken in the plane of the curved line 5—5 of Fig. 2.

Figs. 6 and 7 are vertical sectional views of modified forms of the agitator disc shown in Figs. 1-5, inclusive.

Fig. 8 is a side elevation of an agitator shaft provided with discs of another form embodying the invention.

Figs. 9 and 12 are top and bottom views, respectively, of the form of agitator disc shown in Fig. 8.

Fig. 10 is a sectional view of the disc taken in the plane of the line 10—10 of Fig. 9.

Fig. 11 is an edge view of the same.

Fig. 13 is a side elevation of another agitator provided with a disc such as shown in Figs. 1-5, inclusive, in combination with a collapsible disc.

In that embodiment of the invention shown in Figs. 1-5, inclusive, the motor 10 drives the agitator shaft 11, on which are mounted discs 12, 13 exemplifying the preferred form of my invention. The discs 12 and 13 are identical excepting that the lower disc 12 is slightly smaller in diameter than the disc 13.

As shown in Figs. 2-5, inclusive, each of said discs is centrally apertured at 14 to fit the shaft 11, and has a peripheral portion 15 which is flat, smooth and disposed in a horizontal plane, the circumferential edge 16 being concentric and free from undulations, scallops, serrations or other flow-obstructing contours.

Between the aperture 14 and peripheral portion 15, the disc is embossed to form undulations which rise and fall in concentric paths, the raised or convex sectors 17 and depressed or concave sectors 18 on the top surface registering with the concave sectors 18 and convex sectors 17, respectively, of the lower surface. In other words, the top and bottom surfaces of the disc are substantially parallel to each other. A description of the top surface, therefore, will disclose the construction of the bottom surface also. Each convex sector 17 rises gently from the aperture 14 to a point 19 near the peripheral annular portion 15, and then slopes and merges with the said smooth portion 15 in the concentric path indicated by the line 20. Each concave sector 18 slopes downwardly gently from the aperture 14 to the point 21 near the peripheral annular portion 15 and then rises and merges with the said part 15 in the concentric path indicated by the line 20.

Viewed from a concentric section as indicated by the line 5—5 of Fig. 2, the undulations 17—18 rise and fall slightly above and below the horizontal median plane of the disc as a whole. As shown in the top view, Fig. 2, the highest region of each undulation is indicated at 19 and the lowest at 21 and from these regions the surfaces slope radially in opposite directions toward the aperture 14 and concentric peripheral portion 15.

The discs shown in Figs. 6 and 7 are identical in construction with the discs 12, 13, excepting that the peripheral portions 22 and 23, respectively, corresponding to the part 15 heretofore described, are curved radially upwardly and downwardly, respectively. However, like all the agitator discs embodying this invention, they have the characteristic feature that the peripheral portion is free from undulations, scallops and serrations.

Referring now to Figs. 8-12, inclusive, the agitator shaft 25 has mounted thereon discs 26, 27, the lower one being slightly smaller in diameter than the upper one, but otherwise identical therewith. As shown in Figs. 9-12, inclusive, each disc comprises an initially smooth button in which the major surfaces, both top and bottom, slope or curve gently from the central aperture 28 to the peripheral concentric edge 29, the center of the disc being thicker than the peripheral portion. The disc is machined to remove metal from a plurality of sections of the top indicated at 30 and from the bottom as indicated at 31. Preferably, four of such sections are removed from non-registering portions of opposite sides. Between the said peripheral edge 29 and the central surfaces 32, defined by the vertical surfaces 33 of the cut away portions 30 and 31, the disc surfaces are undulated in generally concentric paths by reason of the alternating cut away sections 30 and intermediate surfaces 34 of the top and the alternating cut away sections 31 and intermediate surfaces 35 of the bottom.

In Fig. 13, I have shown an agitator shaft 36 provided with an agitator disc such as the disc 13 of Figs. 1-5, inclusive, in combination with a collapsible button 37. The button 37 may be constructed in accordance with my Design Patent No. 118,249. By using this combination of agitator discs on one shaft, the mixing time can be reduced but the degree of aeration is not quite as great as that produced by using the agitators shown in Figs. 1 and 8.

My studies and experiments have proven that if the undulations or other contours of the agitator disc or discs are too sharp or severe, that is, if they present definite fluid obstructing or striking surfaces, aeration of the mixture will be destroyed or will not take place, and if the contours are exceedingly mild so that the discs have practically no material dispersing surfaces, the time required for reducing the semi-solids, such as ice cream, to liquid form is too great.

The agitators herein described, embodying my invention, have been designed to aerate drinks with more and finer bubbles than has heretofore been possible, and without increasing the mixing time required by the speediest of the prior art devices. Drink mixer motors operate at 12,000 R. P. M. and it is estimated that an air bubble, traveling with the mixture in a downward path relatively to the agitator shaft and at a slower rate of speed than the agitator, will move over the agitator disc in a spiral path while the agitator disc is making four or five turns. Since there are six undulations on the preferred form of agitator disc, the air bubble will be contacted twenty-five or thirty times, and will be broken into very small bubbles which are folded into the drink. The number and form of undulations on the agitator discs shown are believed to represent the optimum designs for producing speedily a high degree of aeration. If a substantially lesser number of undulations is used, the mixing speed is reduced, and if a larger number, say twelve, is used, the effect is similar to that obtained with a plain disc.

I attribute the excellent results obtained to the fact that agitators embodying my invention have the proper contour for enfolding air bubbles in the drink without producing such violent action that the air bubbles are destroyed. An important feature of construction in this respect is the provision of the plain concentric peripheral portions on each of the several forms of disc shown. The fact that the peripheral portion is free from flow-obstructing configuration, being circumferentially smooth and uninterrupted, with both upper and lower surfaces free from undulations or corrugations, is a factor in producing the desired results, far superior to those obtained by using discs on which embossing extends to the periphery.

Changes may be made in details of construction without departing from the scope of my invention.

I claim:

1. In a drink mixer an agitator comprising a disc and a high speed rotatable shaft on which the disc is mounted, said disc having a plain peripheral portion of substantially uniform width which is a continuous circle in one plane, the disc inwardly of said plain peripheral portion being provided with fluid dispersing and aeration-producing surfaces, said surfaces being symmetrically undulating and serving to finely divide air bubbles in the drink being agitated, and said disc as a whole being free from abrupt flow-obstructing and air bubble destroying surfaces and edges.

2. In a drink mixer an agitator comprising a disc and a high speed rotatable shaft on which the disc is mounted, said disc having a plain peripheral portion of substantially uniform width which is a continuous circle in one plane, the disc inwardly of said plain peripheral portion being provided with fluid dispersing and aeration-producing surfaces, said surfaces being symmetrically concave and convex in a concentric path and serving to finely divide air bubbles in the drink being agitated, and said disc as a whole being free from abrupt flow-obstructing and air bubble destroying surfaces and edges.

3. In a drink mixer an agitator comprising a disc and a high speed rotatable shaft on which the disc is mounted, said disc having a concentric, plain, relatively narrow peripheral portion of substantially uniform width which is a continuous circle in one plane, and a series of undulating, fluid dispersing and aeration-producing surfaces located inwardly of said peripheral portion, said surfaces being alternately symmetrically concave and convex in concentric paths, said convex surfaces being inclined radially upwardly and then downwardly from center to peripheral portion and said concave surfaces being inclined radially downwardly and then upwardly from center to peripheral portion, the said fluid dispersing surfaces serving to finely divide air bubbles in the drink being agitated, and said disc as a whole being free from abrupt flow-obstructing and air bubble destroying surfaces and edges.

ARTHUR W. SEYFRIED.